J. J. MATHEY & W. J. BINARD.
STEERING TRUCK FOR TRACTION ENGINES.
APPLICATION FILED MAY 24, 1913.
1,092,376.
Patented Apr. 7, 1914.
2 SHEETS—SHEET 2.
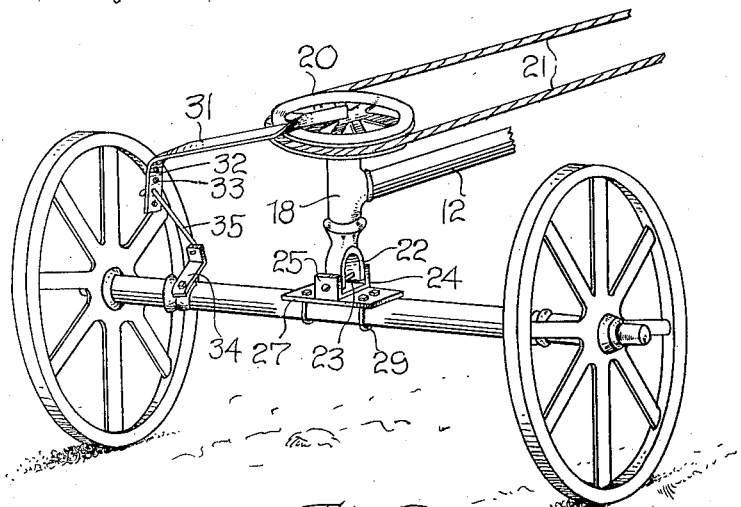
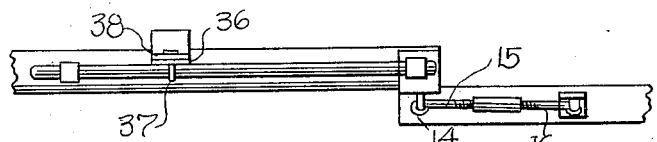
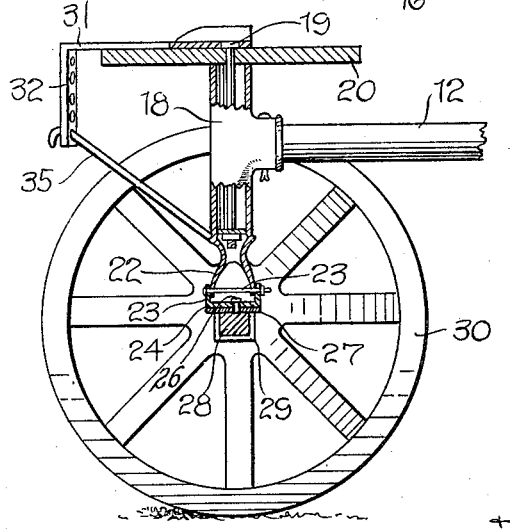
Inventors
JOHN J MATHEY
W. J. BINARD.
Witnesses
Robert M. Sutphen
A. I. Hind
By Watson E. Coleman
Attorney ton
UNITED STATES PATENT OFFICE.

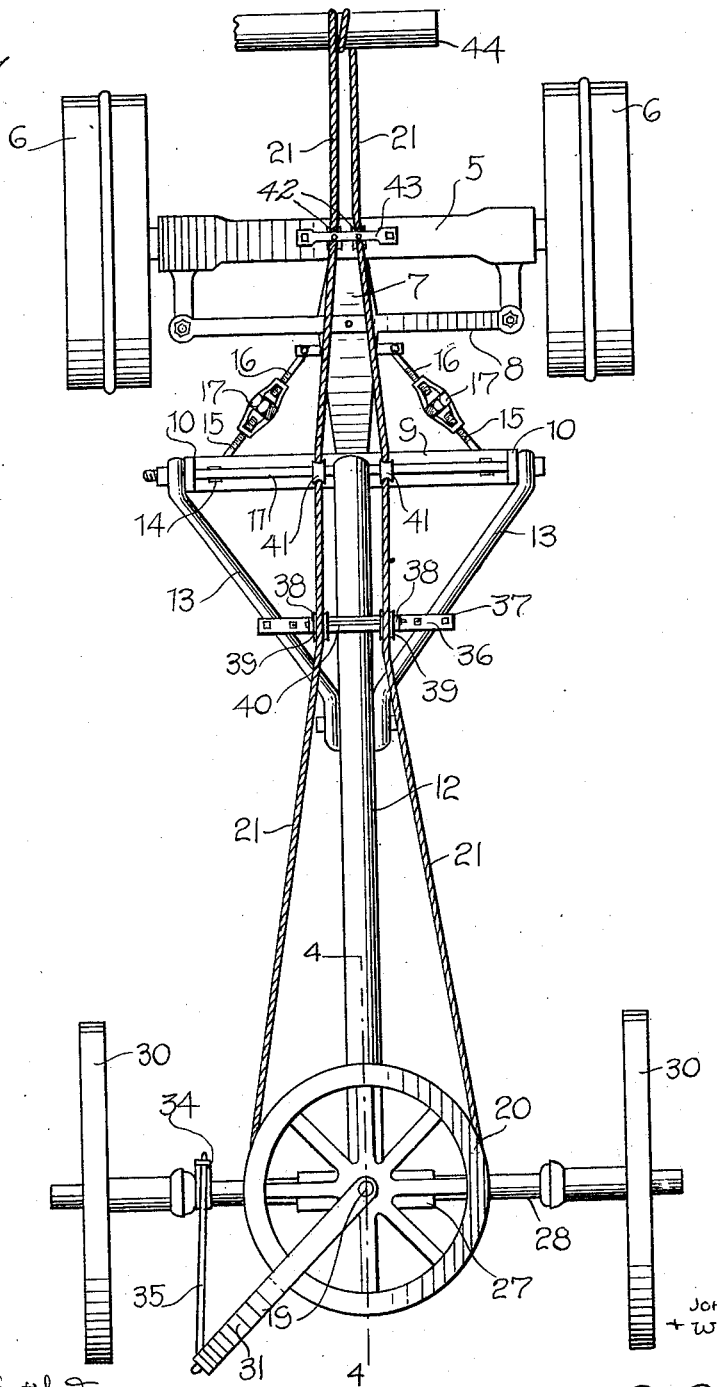

JOHN J. MATHEY AND WILLIAM J. BINARD, OF WHITE LAKE, SOUTH DAKOTA.

STEERING-TRUCK FOR TRACTION-ENGINES.

1,092,376.  Specification of Letters Patent.  Patented Apr. 7, 1914.

Application filed May 24, 1913. Serial No. 769,743.

*To all whom it may concern:*

Be it known that we, JOHN J. MATHEY and WILLIAM J. BINARD, citizens of the United States, residing at White Lake, in the county of Aurora and State of South Dakota, have invented certain new and useful Improvements in Steering-Trucks for Traction-Engines, of which the following is a specification, reference being had to the accompanying drawings.

This invention relates to an improved steering truck for traction engines and the like and has for its primary object to provide improved means for preventing the truck wheels being thrown out of the furrow by encountering obstructions or hollows therein.

The invention has for a further object the provision in a device of this character, of a vertically disposed steering shaft, a truck axle pivotally mounted on the lower end thereof, a flexible steering connection with the upper end of said shaft, and means mounted upon the shaft and connected to the truck axle for automatically returning the truck wheels to their normal positions when the same are thrown out of the furrow, thereby relieving the operator of the necessity of actuating the flexible steering connection.

Still another object of the invention resides in the provision of a device for the above purpose which is simple and durable in its construction, may be produced at small manufacturing cost and is highly efficient and reliable in practical use.

With the above and other objects in view as will become apparent as the description proceeds, the invention consists in certain constructions, combinations and arrangements of the parts that we shall hereinafter fully describe and claim.

For a full understanding of the invention, reference is to be had to the following description and accompanying drawings, in which—

Figure 1 is a top plan view illustrating the forward wheel carrying axle of a traction engine, and the tongue and our improved steering truck mounted upon said tongue; Fig. 2 is a side elevation of the rear end of the tongue showing the adjusting means therefor; Fig. 3 is a perspective view of the steering truck; Fig. 4 is a section taken on the line 4—4 of Fig. 1.

Referring in detail to the drawings, 5 designates the forward wheel supporting axle of a traction engine or similar machine and 6 indicates the wheels revolubly mounted upon the ends thereof. A forwardly extending supporting member 7 is centrally pivoted to the axle 5 and upon the same, the steering rod or bar 8 connected to the knuckles of the traction wheels is pivotally mounted. Upon the forward end of the supporting member 7, a transversely disposed bar or plate 9 is pivotally mounted intermediate of its ends, the ends of said bar being upwardly bent or flanged as indicated at 10, and provided with openings to receive a bolt or rod 11. This rod extends through an opening in the rear end of the tongue or pole 12 and to opposite ends of said rod, the rear ends of the brace bars 13 are connected, the forward ends of said bars being fixed to opposite sides of the tongue 12 as shown. In the bar or plate 9, adjacent to opposite ends thereof, the depending eyebolts 14 are mounted to which the rods 15 are connected. Similar rods 16 are loosely connected to the bolts fixed in the supporting members 7. The rods 15 and 16 are threaded in reverse directions upon their opposed ends and connected by means of the turn buckles 17. It is obvious that by simply adjusting these turn buckles, the plate 9 may be moved upon the forward end of the supporting member 7 and the tongue or pole 12 turned to one side or the other of the longitudinal center of the machine.

Upon the forward end of the tongue or pole 12, a vertically disposed bearing sleeve 18 is secured in any preferred manner and in this sleeve, the steering shaft 19 is mounted to rotate. Upon the upper end of this shaft, the wheel 20 is fixed, said wheel having a peripheral groove to receive the flexible steering rope 21. To the lower end of the steering shaft 19, a bifurcated member 22 is secured, the arms of said member being loosely mounted upon a bolt 23 which is fixed in the ears 25 formed upon the ends of a plate 24. This plate is loosely mounted at its center upon a stud bolt 26 which is fixed to a plate 27 carried by the wheel supporting axle 28. Clip bolts 29 secure the plate 27 to said axle. Upon opposite ends of the axle 28, the truck wheels 30 are revolubly mounted. By connecting the truck axle to the lower end of the steering shaft 19 in the manner above described, it will be seen that the same may be tilted transversely with relation to the supporting tongue or pole 12 so that the truck will operate efficiently upon a hillside.

To the steering wheel 20, a radially disposed arm 31 is fixed at its inner end. The outer end portion of this arm which projects beyond the periphery of the steering wheel is yieldable and has a depending terminal 32 provided with a series of spaced openings 33. To the truck axle 28, a plate 34 is secured, said plate being provided with an opening to receive one end of a connecting rod 35, the other end of which is adapted to pass through one of the openings in the depending outer end of the arm 31. Suitable nuts may be threaded upon the ends of this rod 35 to retain the same in connection with said arm and the plate 34.

Upon the pole or tongue 12, adjacent its rear end, and the brace rods 13, a transverse plate 36 is secured by means of the clip bolts 37. Upon the opposite ends of this plate, the supporting brackets 38 are secured by said clip bolts and rollers 39 are mounted upon a rod 40 which connects the upper ends of the bracket plates. Similar rollers 41 are mounted upon the rod 11 which connects the ends of the plate 9. With these rollers, the steering rope or cable 21 engages, said rope extending over the rollers 39 and under the rollers 41. From these latter rollers, the steering rope extends rearwardly over the guide rollers 42 which are suitably mounted on a plate 43, said plate being fixed at its ends to the axle 5. From these rollers, the steering rope passes around a drum 44 mounted upon the body of the vehicle and actuated in any preferred manner.

From the foregoing, it is believed that the construction and manner of operation of our invention will be clearly and fully understood. After the operator has properly positioned the tongue 12 by adjusting the turn buckles 17 so as to engage one of the wheels of the truck in the furrow, the drum 44 whereby the steering connection 21 is operated is locked. The attention of the operator to the steering of the machine is now no longer necessary as the truck wheel will be automatically held in its position in the furrow. It will be obvious that should the wheel strike an obstruction, to cause the truck axle 28 to swing upon the lower end of the steering shaft so that the wheel will move out of the furrow, the resilient or yieldable arm 31 which is fixed to the steering wheel 20, will be tensioned in such movement and in returning to its normal condition will also return the truck wheel to the furrow through the medium of the connecting rod 35 between said arm and the plate 34 which is fixed to the truck axle. It will thus be seen that the truck wheel will be at all times maintained in position in the furrow and the engine properly steered or guided. Our improved truck may also be advantageously employed in road grading work and various other instances where such a device is highly desirable.

From the above, it will be seen that we have produced an improved steering truck for traction engines and the like which is extremely simple in its construction, may be produced at small manufacturing cost and is very reliable and efficient in actual operation. By means of our invention, the operator is relieved of considerable work now required in the proper steering of the vehicle so that he can give his undivided attention to the operation of the latter.

It will of course be obvious that our invention is susceptible of a great many modifications in the form, proportion and arrangement of the minor details and we reserve the right to resort to such legitimate changes as may fairly fall within the scope of the invention as claimed.

Having thus described the invention, what is claimed is:

1. A steering truck for traction engines and the like comprising a vertically disposed steering shaft, a truck axle swiveled upon the lower end of said shaft for pivotal movement in two directions, supporting wheels mounted upon the ends of said axle, a radially disposed yieldable arm fixed to the upper end of the steering shaft provided with a plurality of openings, and a rod connected to the truck axle at one of its ends and adapted for adjustable engagement at its other end in the openings of said arm to yieldingly hold the axle against movement with relation to the steering shaft.

2. A steering truck for traction engines and the like comprising a vertically disposed shaft, a truck axle swiveled upon the lower end of said shaft for pivotal movement in two directions, supporting wheels mounted in the ends of said axle, a steering wheel fixed to the upper end of the shaft, a radially disposed yieldable arm secured to said wheel and projecting beyond the periphery thereof, said arm having a depending outer terminal provided with a series of openings, and a rod connected at one end to the axle and adapted for adjustable engagement at its other end in the openings of said arm to hold the truck axle against pivotal movement with relation to the steering shaft.

3. The combination with a traction engine or the like, of a support extending forwardly from the front axle of said engine, a transversely disposed bar pivotally mounted intermediate of its ends, upon said support, a tongue mounted at its rear end upon said bar, a truck supporting the forward end of said tongue, rods attached to the opposite ends of said bar, additional rods attached to said support, the opposed ends of the rods connected to the bar and support being oppositely threaded, and turn buckles connecting the opposed rods to adjust the bar upon the support and swing the tongue to position the truck wheels with relation to the traction wheels.

In testimony whereof we hereunto affix our signatures in the presence of two witnesses.

JOHN J. MATHEY.
WILLIAM J. BINARD.

Witnesses:
P. MATHEY,
PETER THILTGEN.